C. W. WILDE.
FEEDING DEVICE FOR GRAIN-DRILLS.

No. 188,454. Patented March 13, 1877.

WITNESSES
Nat. E. Oliphant,
Thos. D. D. Ormond.

INVENTOR
Charles W. Wilde,
per Chas. H. Fowler,
Attorney.

UNITED STATES PATENT OFFICE.

CHARLES W. WILDE, OF BERLIN, MICHIGAN.

IMPROVEMENT IN FEEDING DEVICES FOR GRAIN-DRILLS.

Specification forming part of Letters Patent No. 188,454, dated March 13, 1877; application filed December 1, 1876.

*To all whom it may concern:*

Be it known that I, CHARLES W. WILDE, of Berlin, in the county of Ottawa and State of Michigan, have invented a new and valuable Improvement in Feeding Device for Seed-Drills; and I do hereby declare that the following is a full, clear, and exact description of the construction and operation of the same, reference being had to the annexed drawings, making a part of this specification, and to the letters and figures of reference marked thereon.

Figure 1:
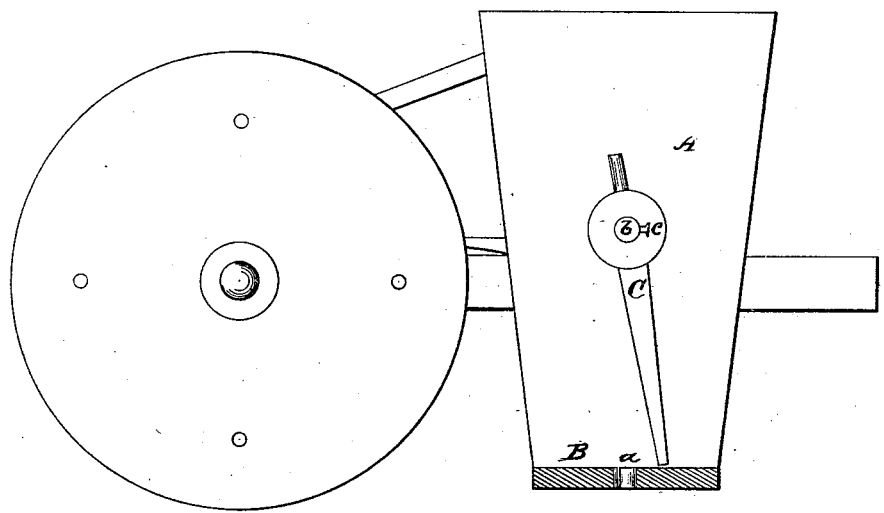
Figure 2:
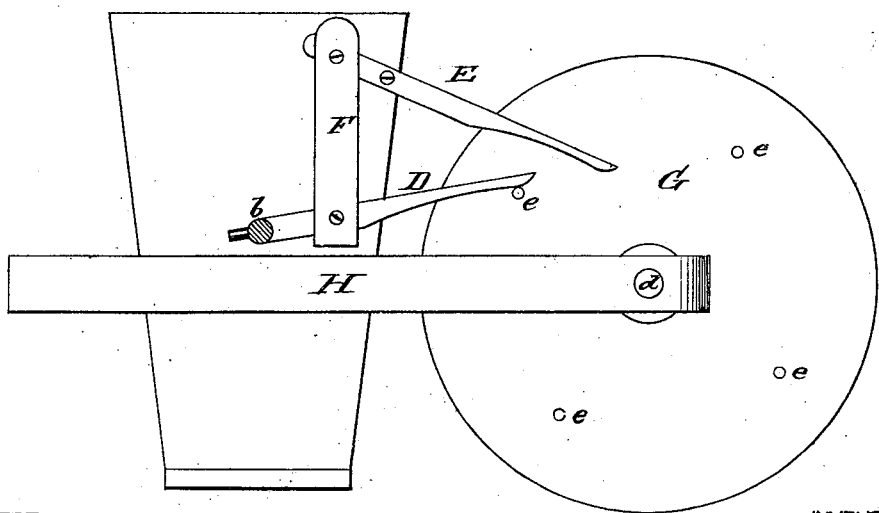

Figure 1 of the drawing is a representation of a side view, partly in section. Fig. 2 is a similar view, showing the operating-levers.

This invention has relation to the feeding mechanism used in seed-drills, corn-planters, and other like agricultural machines; and the invention consists in two levers of different lengths, connected together by a cross-bar or link, said levers being operated by a disk or wheel carrying pins, which, by the revolution of said wheel or disk, strike alternately the ends of said levers, one of which, being connected to an agitator within the hopper, causes it to vibrate, as will be hereinafter described.

In the accompanying drawings, A represents the hopper, of any suitable form and construction, having at its bottom B a suitable opening, *a*, through which the corn or other grain passes. Within the hopper is an agitator, C, connected to an arm, *b*, by a set-screw, *c*. This arm works through an opening in the side of the hopper, and has secured upon its outer end, by a set-screw or other suitable means, a lever, D. A lever, E, is pivoted to the outer side of the hopper A, and both levers are connected together by a link, F. These levers are sharpened or slightly curved near their free ends and upon their under side, and the lower one made somewhat shorter in length.

A wheel or circular disk, G, is hung upon a journal, *d*, rigidly connected to a horizontal beam, H, said wheel or disk carrying pins or projections *e*, placed at equal distances apart, so that when the wheel or disk is rotated the pins, in turn, will strike the ends of the levers, which will cause the agitator to vibrate. The wheel or disk may be connected by suitable gearing to the wheels of the seeder, or by a belt or pulley.

To more fully illustrate the operation of my invention, as the wheel or disk is rotated the pins thereon strike the upper lever and force it upward, while the lower lever, through the medium of the connecting-link, is caused to be forced down, which throws the agitator to one side of the opening in the bottom of the hopper. As the pin which has already acted upon the upper lever passes the end thereof, the next pin following in its turn is brought against the lower lever and raises it, while at the same time the end of the upper lever is lowered, bringing the ends of the two together, or nearly together; and at that point the pin which has acted upon the lower lever passes the end thereof, and again acts, as before, upon the upper one, thereby imparting to the agitator a continuous vibratory motion.

By the simple construction of the levers and their operating mechanism, it will be seen that a very effective feeding device is obtained, which gives a positive movement without any change or failure, and with greatly-reduced friction, no springs nor weights being required; and it can readily be applied with equal effect to every description of planters, fertilizers, and sowers for garden or field seeds where a self-feeding device is required.

Having now fully described my invention, what I claim as my invention, and desire to secure by Letters Patent, is—

The lever D, having secured thereto an agitator, C, and the pivoted lever E, connected to the lever D by a link, F, in combination with a wheel or disk, G, carrying pins or projections *e*, constructed to operate substantially as and for the purpose set forth.

In testimony that I claim the above I have hereunto subscribed my name in the presence of two witnesses.

CHARLES W. WILDE.

Witnesses:
JAMES LOCKLIN,
THOS. WILDE.